Figure 7:
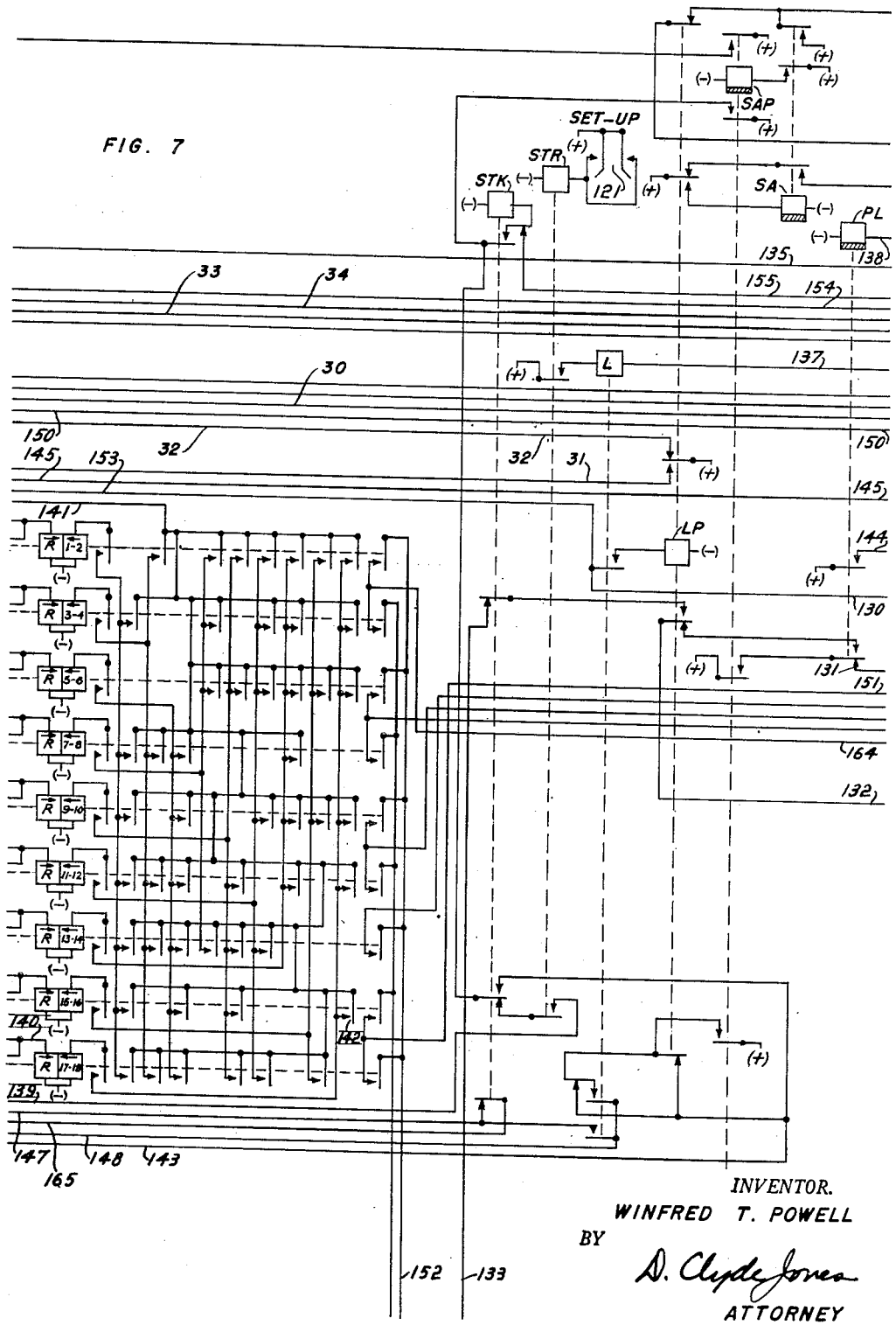
Figure 8:
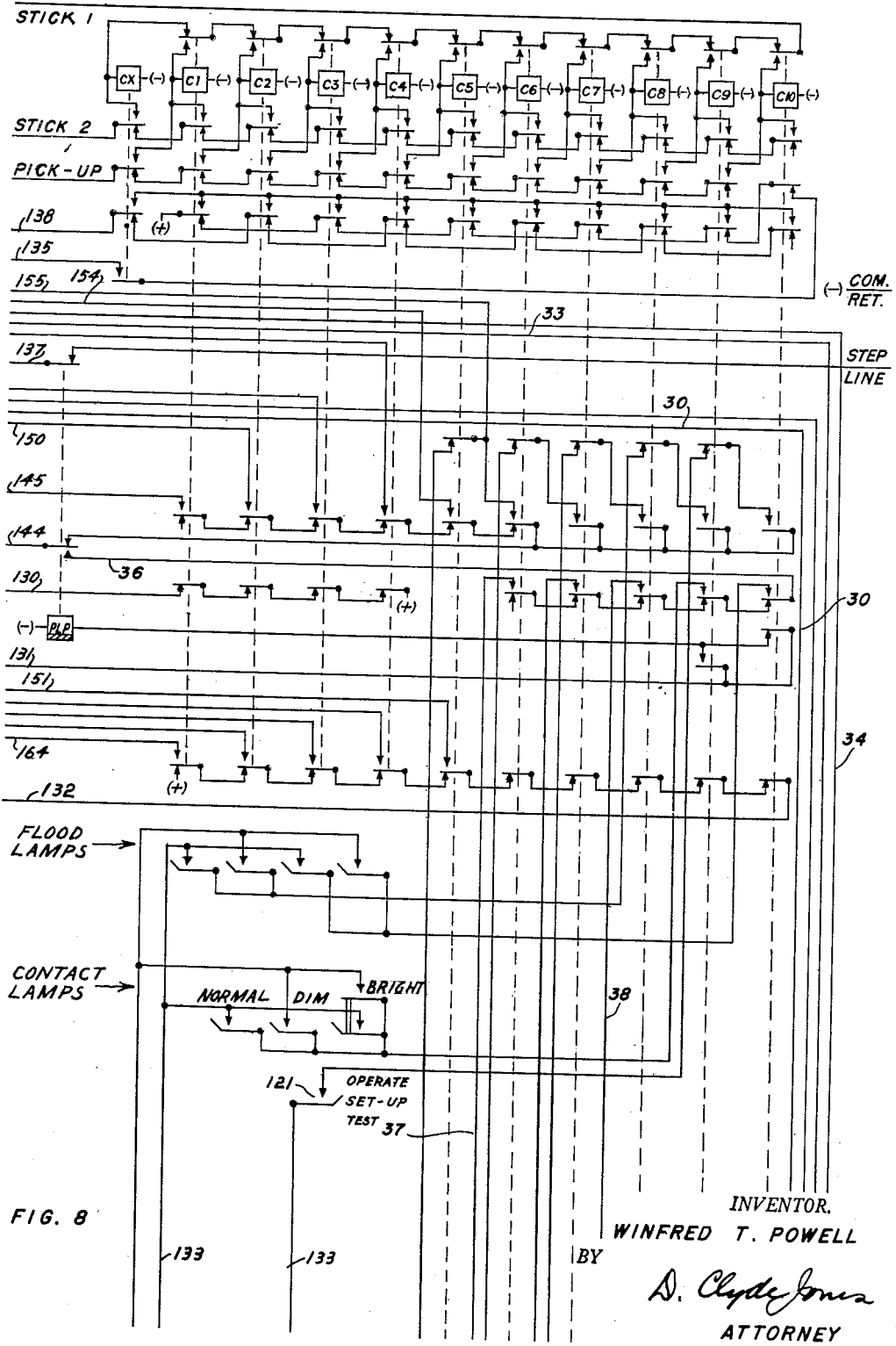

March 23, 1948.　　　W. T. POWELL　　　2,438,453
AIRPORT LIGHTING CONTROL AND INDICATION SYSTEM
Filed Oct. 2, 1944　　　9 Sheets-Sheet 1
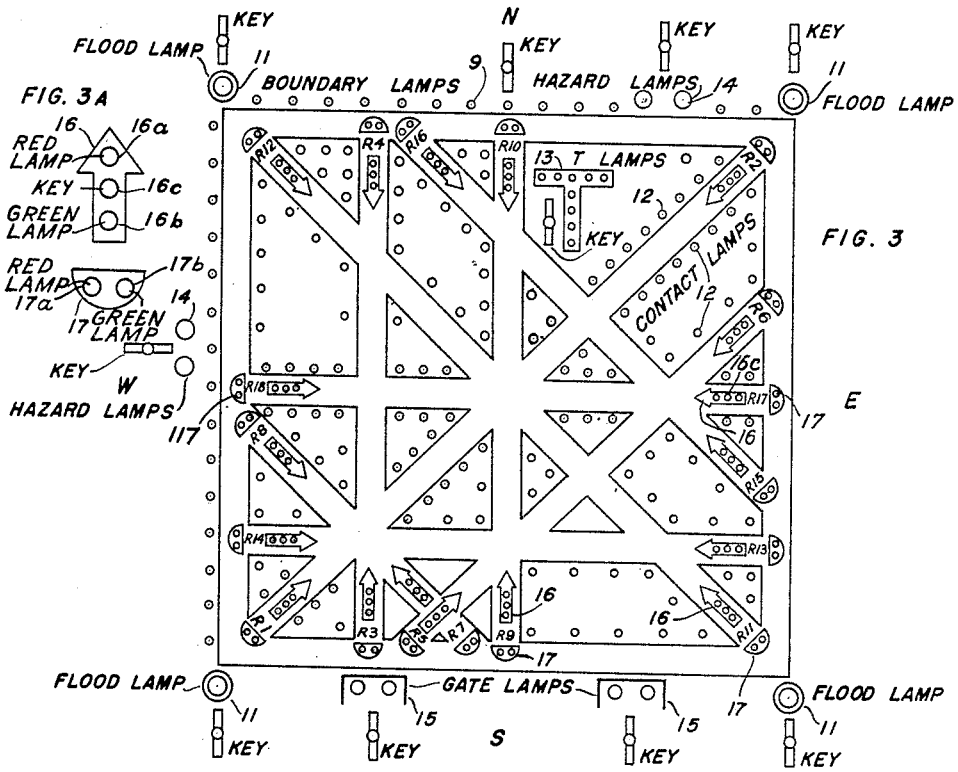
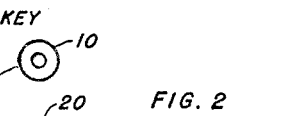
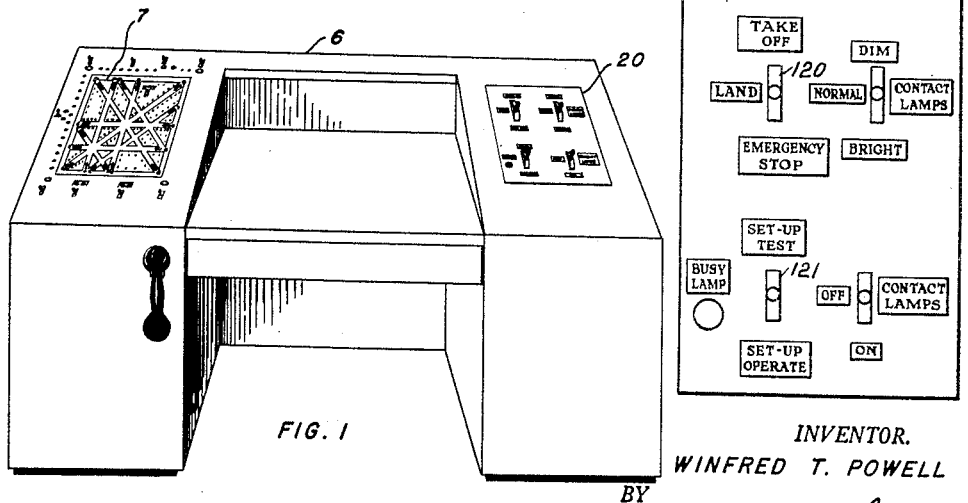
INVENTOR.
WINFRED T. POWELL
BY
D. Clyde Jones
ATTORNEY

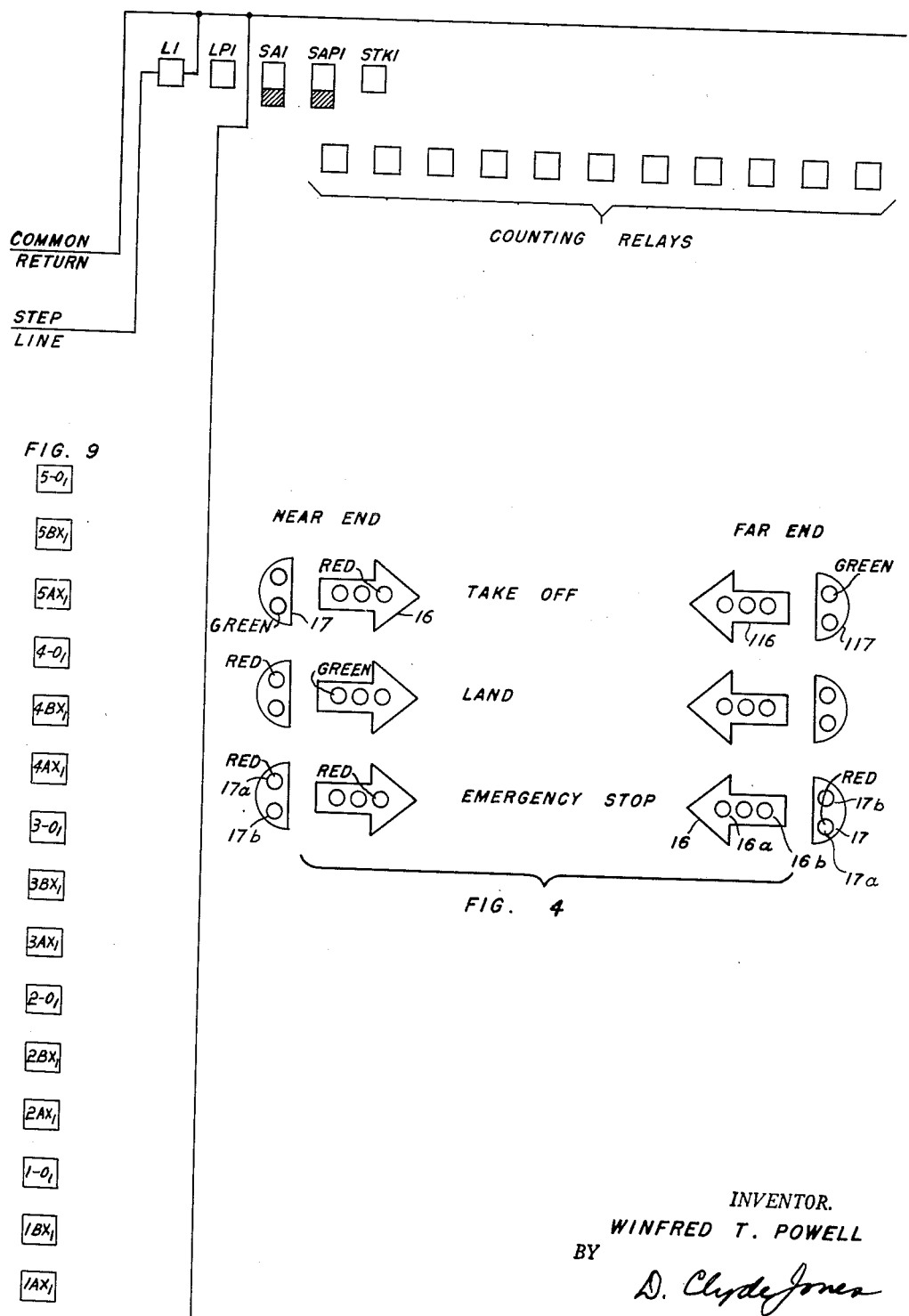

March 23, 1948.    W. T. POWELL    2,438,453
AIRPORT LIGHTING CONTROL AND INDICATION SYSTEM
Filed Oct. 2, 1944    9 Sheets-Sheet 3
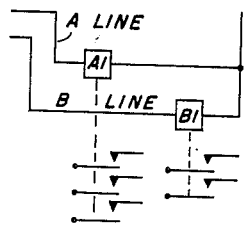
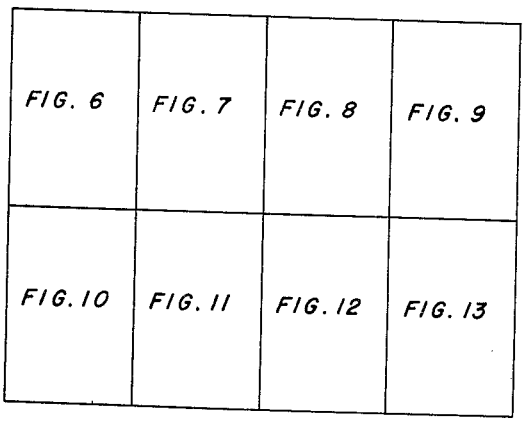
FIG. 5
TO 21ST. RELAYS
FIG. 13
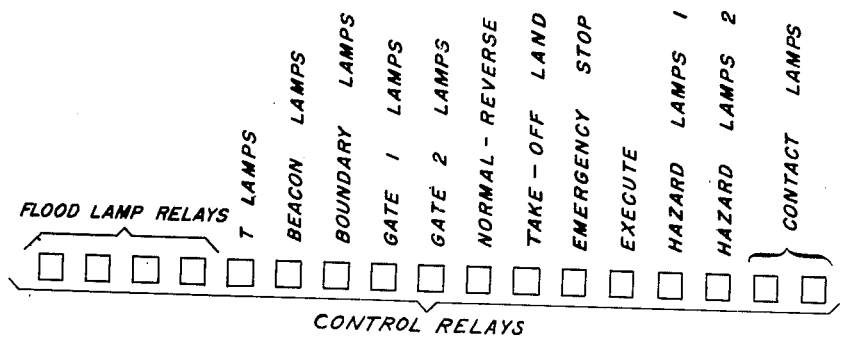
CONTROL RELAYS
INVENTOR.
WINFRED T. POWELL
BY D. Clyde Jones
ATTORNEY March 23, 1948. W. T. POWELL 2,438,453
AIRPORT LIGHTING CONTROL AND INDICATION SYSTEM
Filed Oct. 2, 1944 9 Sheets-Sheet 4
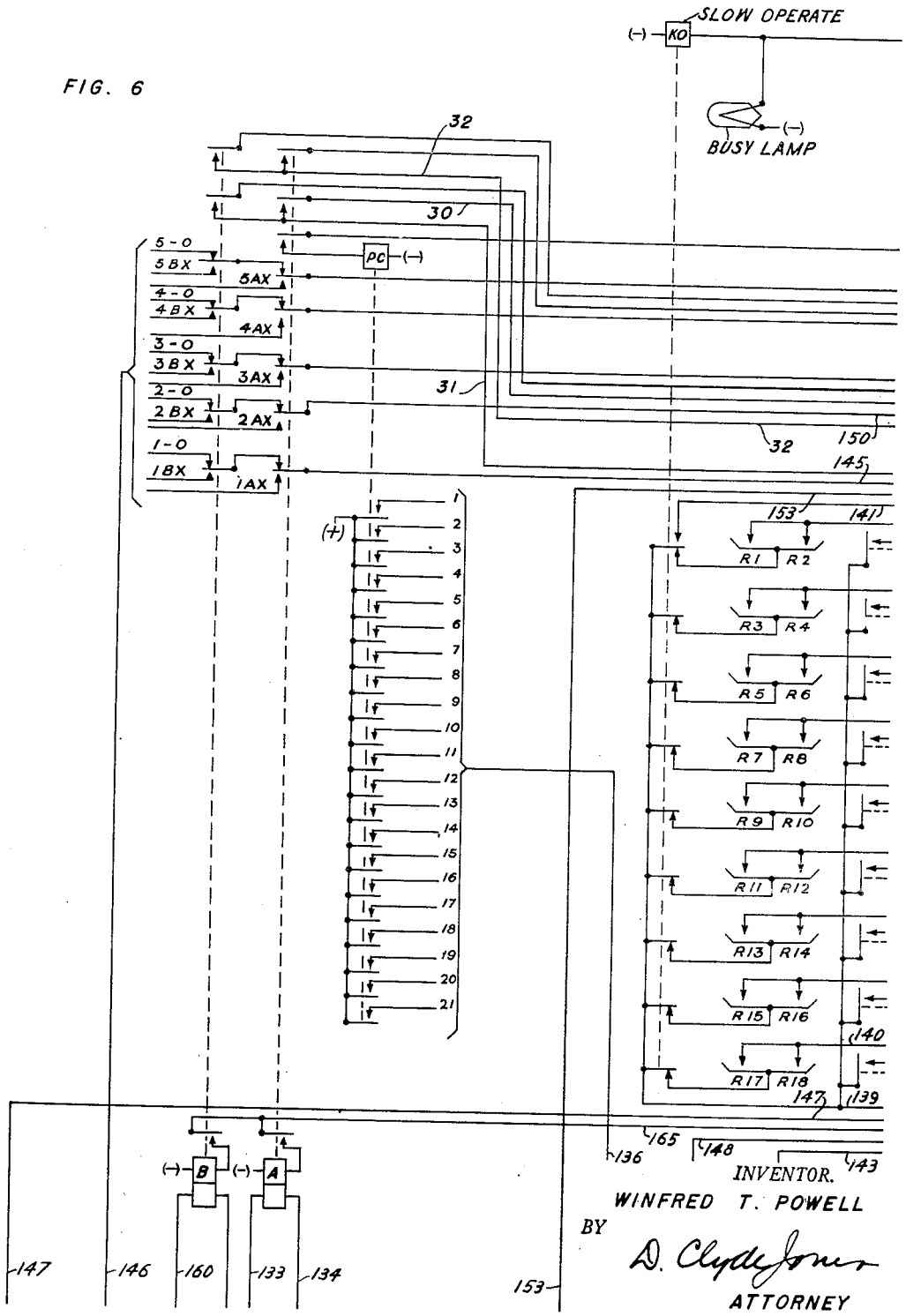
INVENTOR.
WINFRED T. POWELL
BY
D. Clyde Jones
ATTORNEY INVENTOR.
WINFRED T. POWELL
BY
D. Clyde Jones
ATTORNEY March 23, 1948. W. T. POWELL 2,438,453
AIRPORT LIGHTING CONTROL AND INDICATION SYSTEM
Filed Oct. 2, 1944 9 Sheets-Sheet 6

INVENTOR.
WINFRED T. POWELL
BY
D. Clyde Jones
ATTORNEY

Patented Mar. 23, 1948

2,438,453

UNITED STATES PATENT OFFICE 2,438,453

AIRPORT LIGHTING CONTROL AND INDICATION SYSTEM

Winfred T. Powell, Rochester, N. Y., assignor to Stromberg-Carlson Company, Rochester, N. Y., a corporation of New York Application October 2, 1944, Serial No. 556,800

7 Claims. (Cl. 177—353)

This invention relates to a system for directing by distinctive traffic lights, the take-off and landing of airplanes on the several intersecting runways of an airport landing field.

The landing field at a typical large airport comprises intersecting runways. For example, two groups of parallel runways may intersect each other at right angles, while two other groups of runways may also intersect each other at right angles but cross the runways of the first two groups at forty-five degree angles. Thus the several runways may extend in almost every direction, to meet various take-off and landing conditions. With numerous intersecting runways it is essential that traffic thereon be carefully directed to prevent confusion and accidents. This direction of traffic is effected by distinctive lights related to the several runways and controlled from a control point or control tower, preferably remotely located with respect to the several runways.

The main feature of the invention relates to the provision of a system of the type above described, in which a minimum number of conductors, preferably only two pairs of conductors, are required between the control tower and the landing field of an airport.

Another feature of the invention relates to simplified interlocking controls which prevent the dispatcher in the tower from setting the traffic lights at the landing field to direct conflicting traffic.

Other features of the invention will appear from the detailed description and claims when taken with the drawings, in which Fig. 1 illustrates a dispatcher's desk provided with a right hand top panel carrying a group of control keys and a left hand top panel bearing a miniature layout of a landing field; Fig. 2 is an enlarged view of the key panel of Fig. 1; Fig. 3 is an enlarged view of the layout on the left hand panel of Fig. 1, illustrating the intersecting runways of a typical landing field, together with the so called gate lamps, flood lamps, hazard lamps and boundary lamps, as well as contact lamps, T-lamps, a beacon lamp and the lamps associated with the arrows and targets at each end of each runway; Fig. 3A is an enlarged view illustrating the arrangement of colored lamps in one arrow and in its related target, together with a control key as used on the dispatcher's desk, it being understood that the arrows and targets at each end of each runway are as illustrated in Fig. 3A; Fig. 4 illustrates the lighted and unlighted conditions of the lamps at the near end and at the far end of each runway when take-off, land and emergency stop conditions are set up; Fig. 5 is a chart showing the manner in which Figs. 6 to 13 inclusive, are to be arranged in order to disclose the circuits of the control system of the present invention. These figures, with the exception of Figs. 9 and 13, disclose the portion of the control circuits located at the dispatcher's desk in the central tower, while Figs. 9 and 13 indicate that portion of the control arrangement located at the landing field which corresponds to similarly identified relays in the tower and with the suffix I added to relays at the landing field, the detailed circuits of the landing field being omitted since they are duplicates of those employed at the central tower.

Figure 11:
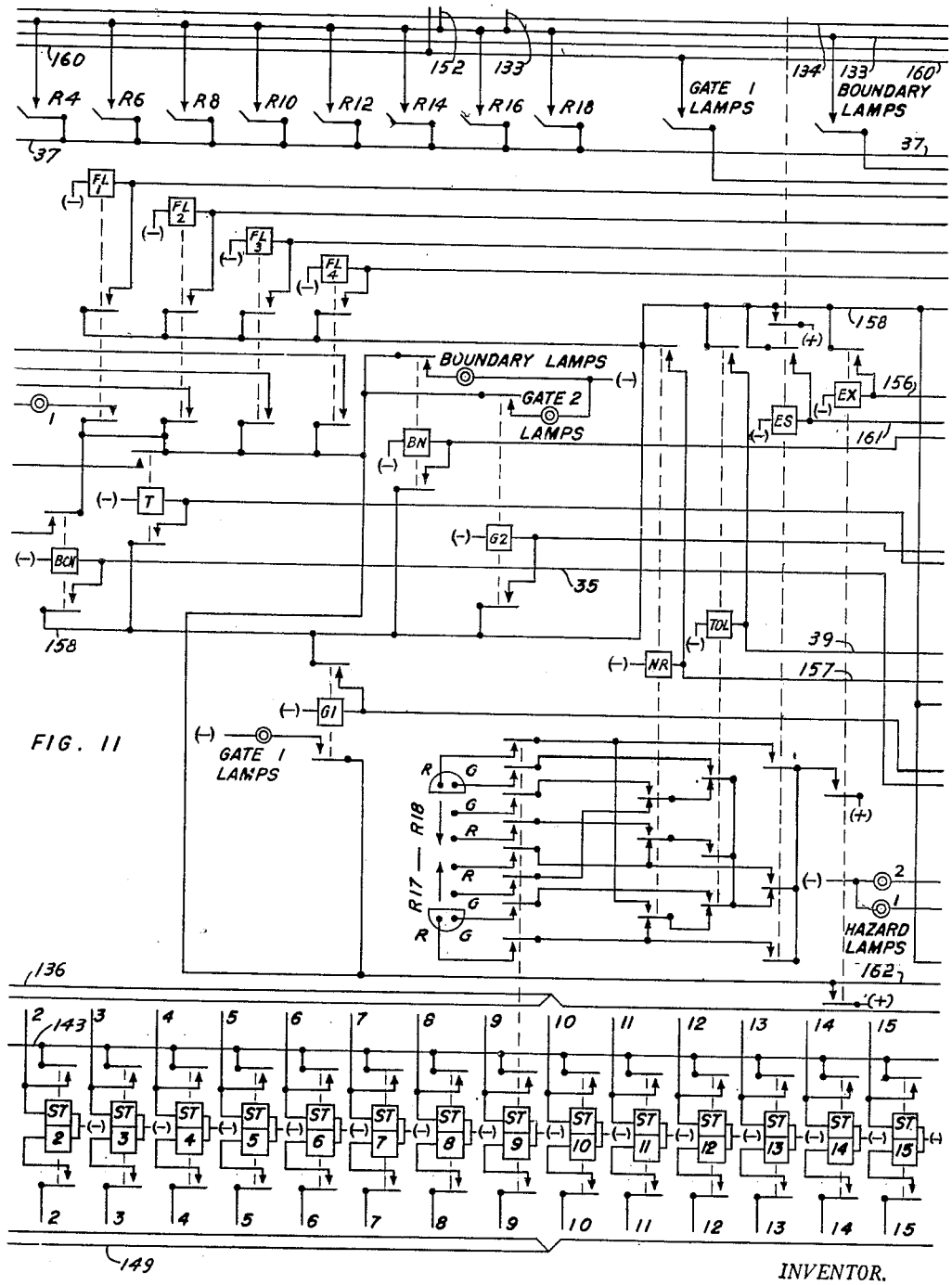

The system of the present invention comprises a landing field with its runways and associated traffic control lights, together with a control center referred to as the control tower. This tower comprises a dispatcher's desk 6 bearing a duplicate layout 7, in miniature, of the runways of the landing field and miniature traffic control lights, as well as related control keys, the lamps being located in the same relation to the miniature runways as those at the landing field. The layout of the landing field has not been illustrated since it is identical except in size with the miniature layout of Fig. 3, and, with the further exception, that the keys shown in this figure, together with the keys R1 to R18, inclusive and the runway relays R1-2 to R17-18, inclusive of Figs. 6, 7 and 11, are omitted at the landing field. In this connection, even numbered keys R2 to R18, inclusive of Fig. 11 are part of correspondingly identified even numbered keys of Fig. 6.

On the miniature layout of the landing field (Fig. 3), as well as the actual landing field (not shown), there are groups of intersecting runways extending in various directions required to meet various take-off and landing conditions. By way of example the present layout discloses nine runways although the invention is not limited to this number. Each runway is referred to as having a "near" and a "far" end. Thus the respective ends of one runway are designated R1 and R2. The ends of the remaining runways are designated R3 and R4; R5 and R6; R7 and R8; R9 and R10; R11 and R12; R13 and R14; R15 and R16; R17 and R18. On the miniature layout as well as at the field proper, there are boundary lamps 9 indicating the limits of the field. In addition there is provided a rotating beacon 10, flood lamps 11 at the respective corners of the field and contact lamps 12 outlining each runway. There are also provided so-called T lamps 13, which constitute part of an illuminated rotatable wind direction indicator. Furthermore, both the layout and the actual field are provided with hazard lamps 14 and gate lamps 15, the latter to indicate loading and unloading positions. Each end of each runway is equipped with an arrow 16 (Fig. 3A) arranged to be lighted in color either by a red lamp 16a or by a green lamp 16b, and is also equipped with a related target 17 illuminated either by a red lamp 17a or by a green lamp 17b under the control of key 16c. The various keys associated with the respective lamps of the miniature layout control not only the miniature lamps of the layout but also the corresponding lamps at the field proper, since the various keys are omitted from the field as mentioned above.

The right hand portion of the dispatcher's desk supports a master panel 20 provided with master control keys and with a busy lamp, which indicates when the system is in operation with the control circuits turned on.

Fig. 4 shows the lighted and unlighted conditions of the target and arrow lamps at the near end and at the far end of a runway when any one of the three following conditions are set up (a) take-off, (b) land, and (c) emergency stop. Referring to Fig. 3 and assuming that the dispatcher desires to control the lighting on the field for a plane to take off from runway R1—R2, he will operate the key 16c associated with the arrow 16 at the R1 end, which is the condition for marking R1 as the near end and R2 as the far end. If he wants to control a plane on the runway R1—R2 from the R2 end to the R1 end, then he operates the key associated with the arrow at the R2 end which marks this end as the near end.

Then other keys are operated for controlling the flood lamps 11, boundary lamps 9, etc., after which the set-up key 121 is actuated to its "operate" position. The system then operates through a cycle to be described and the lamps associated with the selected runway are lighted as indicated in Fig. 4. For example, the green lamp of the target 17 and the red lamp of the arrow 16 at the near end are lighted and the green lamp of the target 117 at the far end is lighted as a plane is to take off from this runway. If a plane is to land, then the red lamp of the target and the green lamp of the arrow at the near end are lighted. An emergency stop condition lights the red lamps of the targets at both ends and the red lamp of the arrow at the near end.

It will be understood that this control is entirely automatic and is controlled by the operation of the key 16c in the arrow 16 of the panel in the control tower. It will be observed that eleven counting relays are used at the tower to provide the selecting and control conditions and this is done by coding the A and B lines in different portions of the counting relay cycle as indicated in Table I which follows.

The specific layout illustrated in Fig. 3 affords twenty-one different runway combinations conveniently referred to as stations. The twenty-one different combinations of runways or stations may be selected as indicated in Table II which follows. In accordance with Table II for example, the nine runways R1—R2 to R17—R18 inclusive are divided into nine separate stations while the combinations of two runways (plus the last combination of three runways) are divided into the remaining twelve stations. These combinations mean that two or three non-conflicting runways may be selected and the lights set up to control the simultaneous landing or take-off of planes on these runways. It will be noted that all of these runway combinations shown at the bottom of Table II are non-conflicting. For example, 1—2 and 5—6 are non-conflicting runways. This combination of two runways is assigned station #10. The X and O marks associated with the A and B lines in the first five positions of the counting relay chain indicates the energized and de-energized conditions respectively of these lines to provide the codes for selecting the stations indicated in the first row, which stations correspond to the runways referred to in the last rows in Table II AR refers to a single lighted runway, BR refers to two runways simultaneously lighted and CR refers to three runways simultaneously lighted.

TABLE I

X=Energized.  O=De-energized.

| Counter positions, Normal | Functions, Pre-conditioning | Code | |
|---|---|---|---|
| | | A Line X | B Line O |
| 1—2—3—4—5 | Select 21 Stations (See Table II) | | |
| 6 Off | AR Normal | O | |
| 6 Off | AR Reverse | X | |
| 6 On | BR Normal | O | |
| 6 On | BR Reverse | X | |
| 7 Off | CR Normal | O | |
| 7 Off | CR Reverse | X | |
| 7 On | Boundary Lamps On | X | |
| 7 On | Boundary Lamps Off | O | |
| 8 Off | Take Off | X | |
| 8 Off | Land | O | |
| 8 On | Emergency Stop Yes | X | |
| 8 On | Emergency Stop No | O | |
| 6 Off | Beacon Lamps On | | X |
| 6 Off | Beacon Lamps Off | | O |
| 6 On | T Lamps On | | X |
| 6 On | T Lamps Off | | O |
| 7 Off | Gate 1 Lamps On | | X |
| 7 Off | Gate 1 Lamps Off | | O |
| 7 On | Gate 2 Lamps On | | X |
| 7 On | Gate 2 Lamps Off | | O |
| 8 Off | Hazard 1 Lamps On | | X |
| 8 Off | Hazard 1 Lamps Off | | O |
| 8 On | Hazard 2 Lamps On | | X |
| 8 On | Hazard 2 Lamps Off | | O |
| 9 Off | Contact Lamps Normal | X | |
| 9 Off | Contact Lamps Dim | X | X |
| 9 Off | Contact Lamps Bright | X | |
| 9 Off | Contact Lamps Off | O | O |
| 9 On | Flood Lamp 1 On | X | |
| 9 On | Flood Lamp 2 On | | X |
| 9 On | Flood Lamp 3 On | X | X |
| 9 On | Flood Lamp 4 On | X | |
| 10 Off | Flood Lamp 1—2—3—4 On | | X |
| 10 Off | | | |
| 10 On | Execute | X | |
| 10 On | Non-Execute | O | |

Table II

Code for 21 station selection

[Positions 1—2—3—4—5]

| Station | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| A Line, Position 1 | X | | O | O | O | O | O | O | O | X | | | | O | O | O | O | O | O | O | O |
| B Line, Position 1 | | X | | | | | | | | | X | X | X | | | | | | | | |
| A Line, Position 2 | O | O | X | | O | O | O | O | O | | X | X | O | | X | X | X | X | O | O | O |
| B Line, Position 2 | | | | X | | | | | | X | O | | | X | | | | | | | | |
| A Line, Position 3 | O | O | O | O | X | | O | O | O | O | O | X | O | X | | O | O | X | | O | X |
| B Line, Position 3 | | | | | | X | | | | | | | X | | X | | | | X | | |
| A Line, Position 4 | O | O | O | O | O | O | X | O | O | O | O | O | O | O | O | X | O | O | X | X | X |
| B Line, Position 4 | | | | | | | | | | | | | | | X | | X | | | | O |
| A Line, Position 5 | O | O | O | O | O | O | O | | X | O | O | O | | O | O | | X | | | X | |
| B Line, Position 5 | | | | | | | | X | | | | | X | | | X | | X | X | | X |
| Runways: | | | | | | | | | | | | | | | | | | | | | |
| AR | 1,2 | 3,4 | 5,6 | 7,8 | 9,10 | 11,12 | 13,14 | 15,16 | 17,18 | 1,2,5,6 | 3,4,5,6 | 3,4,9,10 | 3,15,16 | 7,8,9,10 | 7,8,11,12 | 7,8,15,16 | 7,8,17,18 | 11,12,15,16 | 13,14,15,16 | 13,14,17,18 | 7,8,10,12,15,16 |
| BR | | | | | | | | | | | | | | | | | | | | | |
| CR | | | | | | | | | | | | | | | | | | | | | |

It is believed that the operation of this circuit can be best understood by taking a typical example and describing the circuit operation for this example in detail. It will first be assumed that the operator in the control tower desires to set up the proper condition for a plane to take off from runway R17—18. Referring to Table II, it will be seen that this runway selection is station #9 and by referring to Fig. 4, it will be seen that the green lamps of both targets and the red lamp of the arrow at the near end (R17) are to be lighted. The operator actuates the key 16C associated with the arrow 16 at the R17 end of the runway, then actuates the key 120 of the panel to the take off position and then actuates the set-up key 121 to its operate position. Of course, the other keys will be actuated to control the various other lamp circuits, but this portion of the operation will be described later.

The actuation of the set-up key 121 (Fig. 7) to its operate position closes an obvious circuit for operating start relay STR and this relay closes a circuit for energizing the step line which may be traced from (+), make contact of relay STR, winding of relay L, conductor 137, break contact of relay PLP, step line, winding of relay L1 at the landing field and common return line to (—). Referring to Fig. 7, the operation of relay L in the tower closes a circuit for operating relay LP, this circuit extending from (+), break contacts in series of counting relays C4 to C1, inclusive, conductor 130, make contact of relay L and winding of relay LP to (—). The reason for this circuit for controlling relay LP is to prevent the operation of relay LP until a code determining relay (at left of Fig. 10) has been operated to close a circuit from ground through a make contact of the operated code determining relay to the contact of the L relay. After the first four counting relays have been operated and released, then the coding for station selection has been completed and permanent ground is connected through the back contacts of these first four counting relays to the contact of the L relay because from this time on, it is not necessary to hold off the operation of relay LP.

Relay LP closes an obvious circuit for operating relay SA and this latter relay closes an obvious circuit for operating relay SAP. Relay SAP closes an obvious circuit for operating kick-off relay KO. A circuit is now closed for operating relay PLP (Fig. 8) which extends from (+), make contact of relay SAP, break contact of relay PL, conductor 131, break contact of relay C10 and winding of relay PLP to (—). The operation of relay SA also applies (+) to the stick 1 conductor which operates relay CX over a circuit extending from (+), make contact of relay SA, the stick 1 conductor, break contacts in series of relays C10 to C1, inclusive and winding of relay CX to (—). Relay LP closes a circuit for energizing the A line conductor which extends from (+), break contacts in series of relays C1 to C10, inclusive, conductor 132, make contact of relay LP, break contact of stick relay STK, conductor 133, lower winding of relay A (Fig. 6), conductor 134, the A line conductor and winding of relay A1 (Fig. 13) to (—) permanently connected to the common return conductor. This is a pre-conditioning impulse and is effective to operate relay A which in turn closes a circuit for relay PC extending from (+), break contacts in series of relays C1, C3, C5, C7, C9 and C10, make contact of relay CX, conductor 135, make contact of relay A and winding of relay PC to (—). This operates the pre-conditioning relay PC and it in turn closes circuits for operating all 21 of the station relays. This circuit extends from (+), all 21 make contacts of relay PC, conductors 1 to 21, inclusive, highway conductor 136 and upper windings of station relays ST1 to ST21, inclusive, to (—). When relay PLP (Fig. 8) operates, as above described, the step line is opened which is effective to release relays L and LP (Fig. 7) in sequence. The release of relay LP closes a circuit for operating counting relay C1 which extends from (+), break contact of relay LP, make contact of relay SA, pick-up conductor, make contact of relay CX and winding of relay C1 to (—). A circuit is now closed for operating relay PL which extends from (+), make contacts of relays C1 and CX in series, conductor 13 and winding of relay PL to (—). Relay PL opens the above described circuit of relay PLP, this latter relay releases and again closes the step line for again operating relays L and LP in sequence. The operation of relay LP effects the release of relay CX by opening up the stick 2 conductor. The release of relay CX opens up and releases relay PL which in turn again energizes relay PLP.

This operation of the L and LP relays, in combination with the PL, PLP and counting relays continues to step these counting relays through their cycle of operations. The operating and release functions of the counting relays are controlled in the same manner that the counting relays are controlled by the impulses from the dial in the system disclosed in Powell Patent #2,325,877, granted August 3, 1943. Referring to Figs. 5 and 6 of this patent, it will be observed that the pick-up, stick 1 and stick 2 conductors in the present disclosure, are controlled by relays LP and SA to operate the counting relays in the same manner that conductors 11 (pick-up), 15 (stick 2) and 17 (stick 1) are controlled by relays CBP, 2SA and SAP to operate the counting relays in Patent #2,325,877. In the present system, however, the impulses are provided by the interaction between the counting relays, the LP, PL and PLP relays for providing these impulses in a manner previously explained. Since relays PL and PLP are of the slow release type, these impulses will be properly timed to provide a series of "on" and "off" impulse periods in the step line circuit. The energized periods of the step line will be referred to as the "on" periods and the de-energized periods of the step line will be referred to as the "off" periods. These "on" and "off" periods are used for effecting the proper controls at the proper times and without overlap between the "on" and "off" intervals.

From the above, it will be apparent that the pre-conditioning "on" period (step line energized) is terminated by the operation of relay PLP to mark the beginning of the first "off" period (step line de-energized). Relay PLP next releases to mark the end of the first "off" period and the start of the first "on" period. Relay PLP next energizes to mark the end of the first "on" period and the beginning of the second "off" period. This continues until the tenth "on" period when execution takes place and the circuits are released.

The counting relays are successively operated in successive "off" periods, for example, relay C1 in the first "off," relay C2 in the second "off," relay C3 in the third "off," etc. The operated counting relays are released in the second "on" period following their operation, for example, relay C1 in the second "on," relay C2 in the third "on," relay C3 in the fourth "on," etc. As will be seen from the explanation to follow, during station selection at the first five steps, the A and B lines are conditioned during the "off" periods, with each condition being executed in the following "on" period. Then during the next five steps controls are effected by energizing or not energizing the A or B line during each "on" and each "off" period of these steps.

The operation of key 16C of arrow 16 at the R17 end of runway R17—R18, as above described (this key being illustrated as key R17 in Fig. 6), closes a circuit from (+), make contact of relay SAP, break contact of relay STK, make contact of relay STR, conductor 139, break contact of relay KO, make contact of key R17, conductor 140 and winding of relay R17—18 to (—). Relay R17—18 operates and closes a locking circuit for itself including its left-hand winding to (+) on conductor 139. It will be understood that the runway keys (R1 to R18, inclusive) are actuated before the setup key 121 is operated, then when relay SAP operates in response to the operation of the setup key, as above described, the selected runway relay (R17—18, in this example) will be operated and locked before relay KO is operated.

The circuits of the runway relays (R1—2 to R17—18, inclusive) are arranged so that no two or more of these relays corresponding to conflicting runways can be left operated. For example, assuming that runway key R15 or R16 is actuated at the same time runway key R17 is actuated. This will operate and lock both relays R15—16 and R17—18. Now when relay KO operates, a circuit will be closed for energizing relay R17—18 through its right-hand winding extending from (+) on conductor 139, make contact of relay KO, conductor 141, make contact 142 of relay R15—16, make contact of relay R17—18 and its right-hand winding to (—). Since these windings are differentially connected, relay R17—18 will be released. This circuit from (+) on conductor 141 is extended to all make contacts of all the runway relays except the two shown nearest the coils and the one outside contact of these relays, which contacts are for other purposes. It is not believed necessary to trace out all these circuits in detail, but it will be found that there is a kick-off circuit provided for preventing the simultaneous energization of runway relays corresponding to conflicting runways when relay KO is operated.

Referring back to the operation of the L and LP relays (Fig. 7), when relay LP releases at the end of the pre-conditioning period, the A line is de-energized and relay A is released. It will be recalled that the operation of relay PC closed circuits for operating all of the 21 station or code responsive relays. When relay C1 is operated and also when relay A is released at the end of the pre-conditioning period, the above described operating circuit for relay PC is opened, it releases and remains released throughout the remainder of the cycle. Before relay CP releases, however, a locking circuit is closed for all code responsive station relays, which circuit extends from (+), make contact of relay SAP, break contacts of relays L and LP in multiple, conductor 143, upper make contacts of all code responsive station relays and their upper windings to (—).

The counting, impulsing and impulse repeating relays now step through their cycles of operations until counting relay C10 is operated and counting relay C9 is released. When relay C10 operates and before relay C9 releases, the circuit is closed for operating relay PL. This circuit extends from (+), break contacts in series of relays C1, C3, C5, C7, make contact of relay C9, make contact of relay C10, break contacts in series of relays C8, C6, C4, C2, CX, conductor 138 and winding of relay PL to (—). The release of relay C9 opens up the above described circuit which effects the release of relay PL, but the release of relay PL at the end of the cycle does not close a circuit for operating relay PLP because its circuit is now open at a break contact of relay C10 and a make contact of relay C9. Consequently, the step line is not opened, thus leaving relays L, LP, SA, SAP, KO and C10 energized until the operator restores the setup key 121 for releasing relay STR. Proceeding now with the coding portion of the circuit for selecting station #9, it will be explained how all of the station relays, except relay ST9, are dropped out during the first five steps of the cycle for selecting station #9 by leaving this particular relay energized through the remainder of the cycle. From Table II it will be observed that the only code impulse applied to the A or B lines when station #9 is selected is an impulse applied to the A line in position 5 which is step 5 of the counting relays. This means that stepping will proceed without either relay A or relay B being operated until the fifth step of the cycle.

The code determining relays (Fig. 10) record the condition at each step by means of the operation of an AX relay at the beginning of the "on" period if the A line is energized, by the operation of a BX relay at the "on" period if the B line is energized and by the operation of an O relay at the "on" period if neither line is energized. Since neither the A nor the B relay is energized at the first "on" period, a circuit is closed for operating relay 1—O which extends from (+), make contact of relay PL, conductor 144, break contact of relay PLP, break contacts in series of relays C6, C5, C4, C3, C2, make contact of relay C1, conductor 145, break contacts in series of relays A and B, conductor 1—O, highway 146, conductor 1—O and winding of relay 1—O to (—).

Thus the code determining relay is operated when relay PLP releases to energize the step line and mark the beginning of the "on" period. Now when relay PL releases, the above described operating circuit for the code determining relay is opened, but this relay is now locked through its left-hand contact, conductor 147, make contacts of relay L and make contact of relay SAP to (+). With relays L and LP operated, the break contact of the make before break combination of relay L and the associated break contact of relay LP are opened, which opens the locking circuits of the code responsive station relays including conductor 143 and the make contacts of these station relays. At this time another locking circuit is completed through the make contact of the make before break combination of relay L to the contacts of the code determining relays. Since relay 1—O is operated, this locking circuit extends from (+), make contacts of relays SAP and L, conductor 148, make contacts of relay 1—O, conductors 3 to 9, inclusive and 14 to 21, inclusive, highway 149, conductors 3 to 9, inclusive and 14 to 21, inclusive, make contacts and lower windings of relays ST3 to ST9, inclusive and ST14 to ST21, inclusive to (—) for locking these station relays. Station relays ST1, ST2, ST10, ST11, ST12 and ST13 are released because at this time no locking circuits for these relays are completed. Now when relay L releases, the locking circuit, including the upper make contacts of the station relays and conductor 143, is completed for holding those relays which were left operated in response to the first code above described.

The release of relay L at the end of the first code (first "on" period) releases relay 1—O by opening its locking circuit, since relay PLP is now in its operated position for opening the above described operating circuit for relay 1—O. When relay PLP next releases, after the operation of relay PL (during the second "off" period) the next code determining relay is actuated. Since neither the A nor the B line is energized for the second code, relay 2—O will be operated over the above described circuit extending from (+) on conductor 144, break contacts in series of relays PLP, C6 to C3, inclusive, make contact of relay C2, conductor 150, break contacts of the A and B relays, conductor 2—O, highway 146, conductor 2—O and winding of relay 2—O to (—). Now when relays L and LP operate at the beginning of the second "on" period, the locking circuits of the station relays, including conductor 143, are opened. The second code will now be effective to drop out another group of ST relays. In this instance, since relay 2—O is operated, relays ST3, ST4, ST14 to ST17, inclusive and ST21 have no locking circuits and will be released, thus leaving relays ST5 to ST9, inclusive and ST18 to ST20, inclusive, still operated. The locking circuits for relays ST5 to ST9, inclusive and ST18 to ST20, inclusive include conductor 148 and make contacts of relay 2—O. Relay 2—O is released by the release of relay L in the same manner as described for releasing relay 1—O.

Since neither the A nor the B line is energized for the third code (counting relay C3 operated), relay 3—O will be operated through break contacts of relays A and B. Now when relays L and LP are operated to open the locking circuits of the code responsive station relays, including their upper contacts, another group of these station relays will be released as determined by the circuits through the code determining relay. In this instance, the locking circuits to the lower windings of the station relays by way of make contacts of relay 3—O, include relays ST7 to ST9, inclusive, ST19 and ST20 of those left operated from the preceding codes, thus relays ST5, ST6 and ST18 are released. The fourth code is likewise an open condition of both A and B lines, consequently relay 4—O is operated and when relays L and LP next operate to execute this code, the only relays of those left operated and controlled through contacts of relays 4—O are relays ST8 and ST9, thus releasing relays ST7, ST19 and ST20. Relay LP will be operated at this time over a circuit extending from (+), make contact of relay 4—O, conductor 153, make contact of relay L and winding of relay LP to (—). Relay 4—O is released when relay L releases at the beginning of the fifth "off" period for de-energizing conductor 147.

At the fifth code the A line is energized over a circuit which extends from (+), make contact of relay SAP, make contact of relay PL, break contact of relay LP, conductor 132, break contacts in series of relays C10 to C6, inclusive, make contact of relay C5, conductor 151, make contact of relays R17—18, conductor 152 and lower winding of relay A to the A line. This operates relay A. The A line is de-energized to release relay A when relay LP is operated at the beginning of the fifth "on" period to open the above described circuit.

Relay 5AX is now operated over a circuit extending from (+), make contact of relay PL, conductor 144, break contact of relay PLP, break contact of relay C6, make contact of relay C5, conductor 154, make contact of relay A, conductor 5AX, highway 146, conductor 5AX and winding of relay 5AX to (—). Relay 5AX is locked operated, after this circuit is opened by the release of relay PL, the locking circuit extending over conductor 147 and make contacts of relay L.

Recalling that relays ST8 and ST9 are the only station relays now operated, the fifth code is effective to release relay ST8 and leave relay ST9 energized. Relay ST8 is released when relays L and LP operate to open conductor 143 because the locking circuit for the lower winding of relay ST8 is not extended to a contact of relay 5AX. There is a locking circuit, however, through the 5AX relay to the ST9 relay for maintaining this relay locked. This circuit extends from (+), make contact of relay SAP, make contacts of relay L, conductor 148, make contact of relay 5AX, conductor 9, highway 149, conductor 9, make contact and lower winding of relay ST9 to (—).

When relay L is next released to terminate the fifth code (which happens before relay 5AX is released), the locking circuit for relay ST9 is completed by way of its upper winding and conductor 143. Before relay L next operates, relay STK is operated over a circuit extending from (+), make contact of relay PL, conductor 144, break contact of relay PLP, make contact of relay C6, conductor 155, break contact and winding of relay STK to (—). Relay STK closes a locking circuit for itself extending from (+), make contact of relay SAP, make contact and winding of relay STK to (—). The operation of relay STK extends conductor 143 to (+) at a make contact of relay SAP for providing a permanent locking circuit for the station relay until all circuits are cleared out.

It might be again pointed out at this time that the relays at the landing field corresponding to those relays at the tower are operated in the same manner over similar circuits and in synchronism with those at the tower just described. The circuits of the landing field relays are not shown, but certain of them are indicated and given reference characters corresponding to similar relays in the tower, but with the subscript I added. Furthermore, it will be seen that the station relays are code responsive relays since they respond to codes by either remaining operated or dropping out, in the manner just described.

Station #9 has been selected and it now remains to operate the proper lamps associated with this station, which is runway R17—R18. The upper set of 8 make contacts associated with relay ST9 lead to the arrow and target lamps for this runway (as indicated by the red and green lamp symbols R and G, respectively) and these lamps are controlled by the condition of control relays NR, TOL and ES (Fig. 11), when execution takes place for operating executing relay EX at the end of the cycle, at which time counting relay C10 will be in its operated position. The circuit for operating relay EX extends from (+), make contact of relay LP, conductor 31, make contact of relay A, conductor 30, break contacts in series of relays C5 to C9, inclusive, make contact of relay 10, conductor 156 and winding of relay EX to (—). It will be understood that the circuits from these control relays lead in multiple to all the code responsive station relays, where they are extended by the operation of a particular code responsive station relay to the arrows and targets of the associated station or runway. These contacts have only been shown on relay ST9 for the sake of simplicity, but it will be understood that the same number of contacts appear on all station relays, only one of which is left in its operated condition when execution takes place. This multiple connection is indicated by the usual short tie line which indicates a common connection to contacts of other relays.

Figure 10:
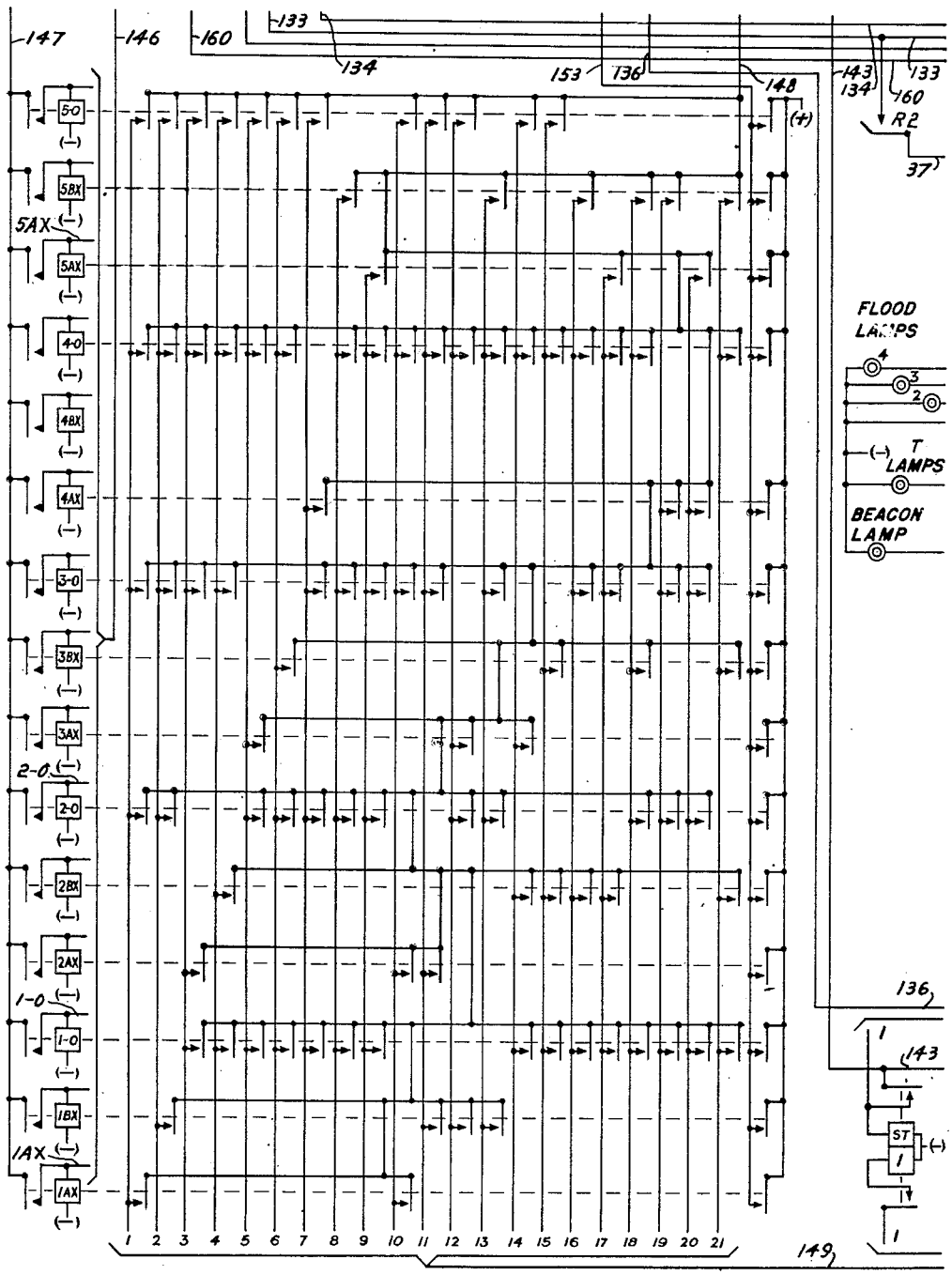

It will now be explained how the lights are controlled in accordance with the condition set up by the dispatcher, assuming station #9 selected. After the fifth code has been recorded, as above described for leaving relay ST9 operated, the counting relay chain steps through positions 6 to 10, inclusive. Each of these steps is divided into a separate and distinct "off" and "on" period, with no overlap, so that two codes can be transmitted by way of the A and B lines at each step. In the above example it was assumed that the operator actuated the controlling key 120 to its "take-off" position and since the key associated with arrow R17 was operated, the runway R17—R18 is set up for controlling the take-off in the normal direction, that is, from the R17 end to the R18 end. It will be understood that the contacts of keys R2, R4, R6, R8, R10, R12, R14, R16, R18 at the top of Figs. 10 and 11 are controlled by the keys with corresponding reference characters shown at the right of Fig. 6. With counting relay C6 operated and relays PL and PLP operated (#6 "off" period), a circuit is extended to the A line for energizing or not energizing this line in accordance with the normal or reverse control respectively of the selected runway. This circuit may be traced from (+), make contact of relay PL, conductor 144, make contact of relay PLP, break contacts in series of relays C10 to C7, inclusive, make contact of relay C6 and conductor 37 to key R18. If key R18 is not operated and key R17 is operated, the A line is not energized since the control is for runway R17 to R18. It will be obvious that the operation of key R18 operates relay R17—18 for selecting this same runway in the manner above described, but in the latter instance the closure of the R18 contact establishes a circuit for energizing the A line during the sixth "off" period. This circuit is from conductor 37 (above traced) make contact of key R18 (Fig. 11), conductor 133, lower winding of relay A, conductor 134, A line, winding of relay AI and common return to (—). Relays A and AI are operated and a circuit is closed for operating relay NR (Fig. 11) which extends from (+), break contact of relay LP, conductor 32, make contact of relay A, conductor 33, break contacts of relays C10 to C7, inclusive, make contact of relay C6, conductor 157 and winding of relay NR to (—). Relay NR is locked to (+) at a make contact of relay SAP until the circuits are cleared out by the restoring of the "set-up" key. It will be understood that relay AI controls similar circuits at the landing field.

When the system advances to the sixth "on" position, relay C5 will be released and since relay C6 is operated at this time, a circuit is completed for controlling the BR runways (which is the condition for the simultaneous control of two runways as indicated in Table II) in the same manner that the AR runways are controlled as now being described. When the system advances to the seventh "off" position the control cricuit is extended through a make contact of relay C7 to a make contact of relay A to determine if relay A is operated or not in accordance with the code for this position. This also applies to relay AI at the landing field.

With the system in its sixth "off" position the B line is energized or not in accordance with whether or not the beacon lamps are to be lighted. If they are to be lighted, a circuit may be traced for operating relay BCN which extends from (+), break contact of relay B, conductor 32, make contact of relay LP, conductor 34, break contacts in series of relays C10 to C7, inclusive, make contact of relay C6, conductor 35 and winding of relay BCN to (—). Relay BCN locks itself operated by way of conductor 158. This circuit requires the energization of the B relay and this relay will be energized when the key which controls the beacon lamp is operated, the circuit being traced from (+), make contact of relay PL, conductor 144, make contact of relay PLP, conductor 36, break contacts in series of relays C10 to C7, inclusive, make contact of relay C6, conductor 37 and beacon lamp key to conductor 160 which extends through the B and BI relays and the B line in series. The operation of the BCN relay, or any other of these control relays, closes a locking circuit by way of conductor 158 and the contact of the operated relay, which maintains the operated relay energized until the circuits are cleared out.

Figure 12:
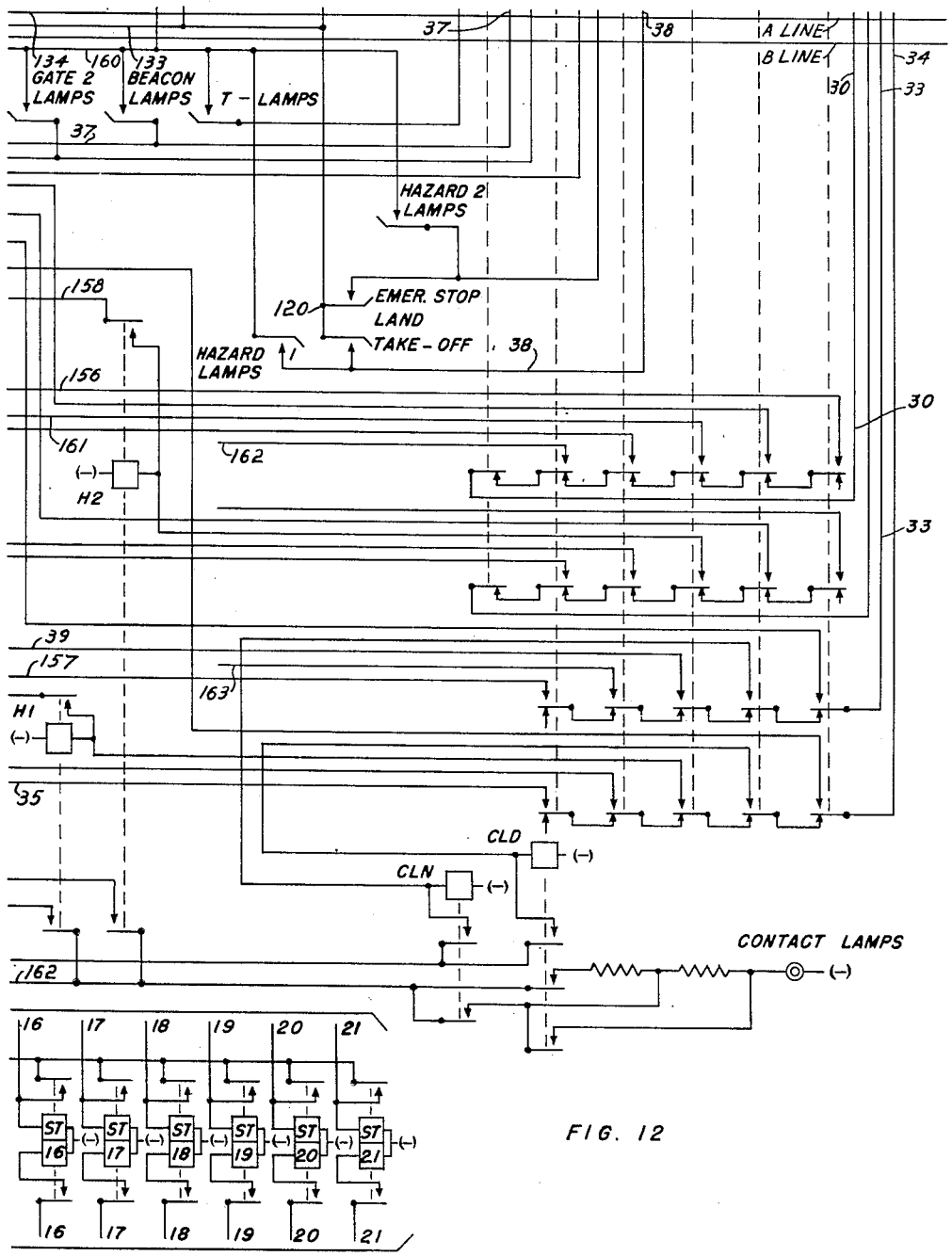

It is believed that the above typical examples of how these lamp control relays are controlled will be sufficient to provide a complete understanding of the control of these relays at the various steps of the system, since the complete circuits for the control tower are illustrated. Since it was assumed that a "take-off" condition is to be controlled in the normal direction for runway R17—R18, it will now be pointed out how the control lamps are selected and energized. Relay NR is operated as already described and relay TOL is operated because the "take-off" key contact 120 is closed in its lower position (Fig. 12). This circuit may be traced from (+), make contact of relay PL, conductor 144, make contact of relay PLP, conductor 36, break contacts in series of relays C10 and C9, make contact of relay C8, conductor 38 and make contact of "take-off" key 120 to conductor 133 for energizing the A line and relays A and A1 in the eighth "off" period. With relay A energized, relay TOL at the tower (and also at the landing field) is energized over a circuit which may be traced from (+), break contact of relay LP, conductor 32, make contact of relay A, conductor 33, break contacts in series of relays C10 and C9, make contact of relay C8, conductor 39 and winding of relay TOL to (—). It will be obvious that relay TOL is not energized when the key is left in its "land" position because the A line is not energized for completing the circuit to relay TOL.

The "emergency stop" condition is set up when key 120 is operated to the "emergency stop" position (upper) for energizing the A line during the eighth "on" period, which is effective to operate and lock "emergency stop" relay ES. This circuit may be traced from (+), make contact of relay LP, conductor 31, make contact of relay A, conductor 30, break contacts in series of relays C5, C6, C7, make contact of relay C8, conductor 161 and winding of relay ES to (—).

The two hazard lamp circuits #1 and #2 are controlled by energizing or not energizing the B line in the eighth "off" and eighth "on" periods, respectively. The contact lamps are lighted, not lighted, lighted dimly, normally or brightly in accordance with the conditioning of the CLN and CLD relays (Fig. 12) in the ninth "off" period in a manner which will be obvious from the circuit shown and from the description of the control of other relays during other "off" and "on" periods of the cycle. The four flood lamps are controlled individually or in combination by energizing or not energizing the A and B lines in the ninth "on" period and by energizing or not energizing the A and B lines in the tenth "off" period, all in a manner which will be obvious from the preceding explanation.

When the counting relays take their tenth step and advance into the tenth "on" position (release of relays PLP and C9 and before relay PL releases), execution takes place if the "setup" key is in its "operate" position. This circuit may be traced from (+), make contact of relay PL, conductor 144, break contact of relay PLP, make contact of relay C10, break contact of relay C9, "setup" key 121, conductor 133, winding of relay A, conductor 134, A line, winding of relay A1 and common return to (—). This operates the A relays for closing a circuit for operating relay EX which may be traced from (+), make contact of relay LP, conductor 31, make contact of relay A, conductor 30, break contacts in series of relays C5 to C9, inclusive, make contact of relay C10, conductor 158 and winding of relay EX to (—). Relay EX locks to (+) on conductor 158 and a circuit is now closed for lighting the lamps as selected by the control relays. In the present example, this circuit extends from (+), make contact of relay EX, break contact of relay ES, inner lower make contact of relay TOL and make contact of relay ST9 to the green lamp in the target at the far (R18) end of the selected runway. The circuit for the green lamp in the near (R17) end of the selected runway extends from the outer lower make contact of relay TOL and a make contact of relay ST9 to this green lamp. The circuit for the red lamp associated with the arrow at the near (R17) end of the selected runway extends through the lower middle make contact of relay TOL, the lower middle break contact of relay NR and make contact of relay ST9 to this lamp. It will be observed that this is the condition shown in Fig. 4 for controlling the "take-off" and since station #9 has been selected, runway R17—R18 is the only one at which the lights are energized.

The operation of relay EX also applies (+), by way of conductor 162, to the other control relay contacts for lighting the other lamps or not lighting these lamps, in accordance with whether or not the associated relays have been operated, such as the flood lamp relays FL1 to FL4, inclusive, the beacon lamp relays BCN, the boundary lamp relays BN, etc. Relay EX remains operated for controlling the lighting of the selected lamps until the dispatcher restores the setup key 121 to normal. This operation releases relay STR which opens up the stepping line for releasing relays L, LP, SA, C10 SAP, KO and STK in sequence. The release of relay SAP effects the release of relay EX and any of the control relays which were operated during the cycle.

It is believed that the above examples are sufficient to give a complete understanding of the operation of the system for controlling the various circuits. It will be understood that the selection of any one station relay above ST9 operates to select two or three simultaneous runways in accordance with the particular station selected. This means that the controls are effective to control "take-off," "land" or "emergency stop" conditions for these runways in normal or reverse in accordance with the keys which are operated on the control panel in the tower. It will be seen from the above explanation that the A line "on" conditioning periods are used for controlling certain relays (EN, BS, etc.) over conductor 30 and that the A line "off" conditioning periods are used for controlling certain other relays (NR, TOL, etc.) over conductor 33. The #6 A line "on" condition (conductor 162) and the #7 A line "off" condition (conductor 163) has not been shown wired to any relay circuit. This means that these positions are reserved for the BR and CR runway combinations shown in Table II and may be connected to NR relays at these positions for controlling the combinations of runways in a manner shown for the AR runway control.

It is believed that another example of the station selection code arrangement will be helpful in understanding just how these code responsive station relays are released in response to the various codes, leaving only the desired one energized after the first 5 codes have been transmitted. Recalling that all 21 station relays are operated during the pre-conditioning period, it will now be assumed that runway relay RI—2 is energized in response to the operation of either key RI or key R2 for selecting runway RI—R2. Referring to Table II it will be seen that the A line is energized in position 1 and this is the only energization of either line during the five periods or positions when station #1 is to be selected.

The energization of the A line operates relay A during the first "off" period of the cycle over a circuit extending from (+), make contact of relay SAP, make contact of relay PL, break contact of relay LP, conductor 132, break contacts in series of relays C10 to C2, inclusive, make contact of relay CI, conductor 164, make contact of relay RI—2, conductor 152, conductor 133, lower winding of relay A, conductor 134, A line, winding of relay AI and common return to (—). Relay A is locked operated by the operation of relay L at the beginning of the first "on" period of the cycle over a circuit extending from (+), make contact of relay SAP, make contacts of relay L, break contact of relay STK, conductor 165, make contact and upper winding of relay A to (—). Consequently, relay A remains locked operated until relay L is released at the end of the first "on" period. Relay IAX is now operated, when relay PLP is released, over a circuit extending from (+), make contact of relay PL, conductor 144, break contact of relay PLP, break contacts in series of relays C6 to C2 inclusive, make contact of relay CI, conductor 145, make contact of relay A, conductor IAX, highway 146, conductor IAX and winding of relay IAX to (—). Relay IAX is locked operated through a make contact of relay L until the end of the first "on" period when relay LP is released. Since neither the A nor the B line is energized at positions 2, 3, 4 or 5 for selecting station relay STI, relays 2—O, 3—O, 4—O, and 5—O will be operated over break contacts of relays A and B when the counters go through these five positions. Now when relay LP is operated at the beginning of the first "on" period, the first code test is made by way of the circuits through the code determining relays. Since relay IAX is operated, a circuit is closed through the make before break contact of relay L and conductor 148 to the make contacts of relay IAX and since these make contacts extend only to the locking circuits of code responsive station relays STI and ST10, all station relays are released at this time except STI and ST10.

The ST10 relay is released when the second code is tested or executed because relay 2—O is operated at this time and the locking circuit for the station relays completed through make contacts of relay 2—O, only extends to one of the two relays left operated from the previous code, that is, to relay STI by way of conductor 1 in highway 149.

The execution of the third code through relay 3—O is completed to relay STI, the execution of the fourth code is completed through a make contact of relay 4—O to relay STI and the execution of the fifth code is completed through a make contact of relay 5—O to relay STI. Consequently, only relay STI of the 21 code responsive relays, operated at the beginning of the cycle, is left operated after the transmission of the five coded impulses.

Comparing Table II with the circuits of the code responsive relays will indicate how the energized (X) and the de-energized (O) conditions of the A and B lines at the five code steps are effective to complete circuits for the required code responsive station relays throughout the five steps by way of the code determining relay contacts. In this connection, it will be remembered that the AX relay is operated in response to a code corresponding to the A line energization, the BX relay is operated in response to the B line energization and the O relay is operated in response to neither the A nor the B line being energized at the corresponding steps of the code series.

What I claim is:

1. In a traffic control system for an airport or the like, a landing field provided with intersecting runways, directive signals for indicating which ends of the runways shall be used as entrances and which ends shall be used as exits, a control tower provided with selectively operated keys at said tower related to the signals located at said field, conductors connecting said tower and said field, a group of relays at said field, said group of relays controlling the selective actuation of the directive signals associated therewith, and means including said conductors controlled by the selective operation of said keys for operating all of the group relays and then selectively releasing all of said group relays except predetermined ones thereof controlling desired signals.

2. In a traffic control system for an airport or the like, a landing field provided with intersecting runways, directive signals for indicating which ends of the runways shall be used as entrances and which ends shall be used as exits, a control tower provided with selectively operated keys related to the signals located thereat, runway relays operated by said keys, said runway relays having windings arranged to be differentially connected when two relays associated with conflicting runways are operated whereby one runway relay related to a conflicting runway is released, a set of conductors connecting said tower and said field, a group of relays at said field, said group of relays controlling the selective actuation of the directive signals associated therewith, and means including said conductors and controlled by the operation of said runway relays for selectively operating said groups of relays.

3. In a traffic directing system for airports or the like in which there are a plurality of runways with lights controlled by series of coded impulses transmitted over a line circuit for controlling traffic either way over the associated runways, a number of code determining relays each corresponding to one of said runways, a number of code responsive relays each corresponding to one of said runways, means for selectively operating one of said code determining relays, means for simultaneously operating all of said code responsive relays, means for holding the operated one of said code determining relays during the transmission of a series of coded impulses, means for releasing all but one of said code responsive relays during the transmission of said series of coded impulses, and means including said one of said code responsive relays for selecting and operating the lights of one and only one of said runways.

4. In a traffic directing system for airports or the like in which there are a plurality of runways with lights controlled by series of coded impulses transmitted over a line circuit for controlling traffic either way over the associated runways, a number of code determining relays each corresponding to one of said runways, a number of code responsive relays which number is greater than the number of impulses in any one of said series each relay corresponding to one of said runways, means for selectively operating one of said code determining relays, means for simultaneously operating all of said code responsive relays, means for holding the operated one of said code determining relays during the transmission of a series of coded impulses, means for releasing all but one of said code responsive relays during the transmission of said series of coded impulses, and means including said one of said code responsive relays for selecting and operating the lights of one and only one of said runways.

5. In a traffic directing system for airports or the like in which there are a plurality of runways with lights controlled by series of coded impulses transmitted over a line circuit for controlling traffic either way over the associated runways, a number of code determining relays each corresponding to one of said runways, a number of code responsive relays which number is greater than the number of impulses in any one of said series each relay corresponding to one of said runways, means for selectively operating one of said code determining relays, means for simultaneously operating all of said code responsive relays, means for holding the operated one of said code determining relays during the transmission of a series of coded impulses, means for releasing all but one of said code responsive relays during the transmission of said series of coded impulses, means including said one of said code responsive relays for selecting and operating the lights of one and only one of said runways, and means controlled over said line circuit for selectively displaying the lights of a selected runway for indicating the direction of traffic thereover.

6. In a station selecting system, a sending location and a receiving location, a station key at the sending location for each station, a station relay at the receiving location for each station, means controlled by the operation of one of said station keys for operating all of said station relays, and means controlled by a number of impulses which is less than half the number of said station relays for releasing all of the operated relays except one, whereby one of said stations at said receiving location is selected.

7. A control system for an airport comprising a plurality of runways certain of said runways conflicting with other runways, a control relay for each runway, means for operating a plurality of said relays, and means including contacts on one of said operated relays and contacts on any other operated relay representing a runway conflicting with that of said one relay for releasing said one relay.

WINFRED T. POWELL.

REFERENCES CITED

The following references are of record in the file of this patent:

UNITED STATES PATENTS

| Number | Name | Date |
| --- | --- | --- |
| 2,051,419 | Preston | Aug. 18, 1936 |
| 2,113,383 | Powell | Apr. 5, 1938 |
| 2,169,480 | Preston | Aug. 15, 1939 |
| 2,216,610 | Culbertson | Oct. 1, 1940 |
| 2,248,822 | Quinby | July 8, 1941 |
| 2,265,310 | Pickell | Dec. 9, 1941 |
| 2,296,941 | Molnar | Sept. 29, 1942 |
| 2,298,946 | Judge | Oct. 13, 1942 |
| 2,344,759 | Wight | Mar. 21, 1944 |